United States Patent
Lewis et al.

(10) Patent No.: US 7,413,120 B2
(45) Date of Patent: Aug. 19, 2008

(54) TRANSACTION CARD ASSEMBLIES AND METHODS

(75) Inventors: Cynthia M. Lewis, Highlands Ranch, CO (US); Ken Algiene, Littleton, CO (US); James F. Price, Alpharetta, GA (US); John R. Duesenberg, Denver, CO (US)

(73) Assignee: First Data Corporation, Englewood, CO (US)

( * ) Notice: Subject to any disclaimer, the term of this patent is extended or adjusted under 35 U.S.C. 154(b) by 0 days.

(21) Appl. No.: 11/483,391

(22) Filed: Jul. 7, 2006

(65) Prior Publication Data

US 2007/0017975 A1    Jan. 25, 2007

Related U.S. Application Data

(63) Continuation of application No. 11/355,858, filed on Feb. 15, 2006, which is a continuation of application No. 11/059,298, filed on Feb. 15, 2005, now Pat. No. 7,080,776.

(60) Provisional application No. 60/638,079, filed on Dec. 20, 2004.

(51) Int. Cl.
*G06K 5/00* (2006.01)
*G06K 19/00* (2006.01)
*G06K 19/06* (2006.01)

(52) U.S. Cl. .................. 235/380; 235/493; 235/487

(58) Field of Classification Search .......... 235/380, 235/493, 487
See application file for complete search history.

(56) References Cited

U.S. PATENT DOCUMENTS

| | | | | |
|---|---|---|---|---|
| 3,676,644 A | * | 7/1972 | Vaccaro et al. | 235/449 |
| 4,092,526 A | * | 5/1978 | Beck | 235/487 |
| 4,455,484 A | * | 6/1984 | Whitehead | 235/493 |
| 4,542,286 A | * | 9/1985 | Golarz | 235/377 |
| 4,620,727 A | * | 11/1986 | Stockburger et al. | 283/82 |
| 4,733,060 A | * | 3/1988 | Dono et al. | 235/379 |
| 5,288,981 A | * | 2/1994 | Davis | 235/449 |
| 5,404,000 A | * | 4/1995 | Nair et al. | 235/435 |
| 7,083,086 B2 | * | 8/2006 | Whitaker | 235/487 |
| 2002/0040937 A1 | * | 4/2002 | Wu et al. | 235/493 |
| 2002/0056959 A1 | * | 5/2002 | Ference | 271/112 |
| 2002/0139849 A1 | * | 10/2002 | Gangi | 235/440 |

* cited by examiner

*Primary Examiner*—Thien M. Le
*Assistant Examiner*—Thien T Mai
(74) *Attorney, Agent, or Firm*—Townsend and Townsend and Crew LLP

(57) ABSTRACT

Transaction card assemblies, systems and methods of making are provided. One such assembly includes a card carrier having a card integrally formed within. The card peripherally engages the card carrier and is adapted to be removed from the card carrier. An encodable strip is disposed on the card. The strip has first and second encodable tracks. The first encodable track is positioned to be read by a point-of-sale device when the card is engaged with the card carrier, and the second encodable track is positioned to be read by the point-of-sale device after the card is separated from the carrier. In this manner, the card can be read using the same point-of-sale device whether or not the card has been separated from the carrier.

13 Claims, 6 Drawing Sheets

TRANSACTION CARD ASSEMBLIES AND METHODS

PRIORITY CLAIM

The present invention claims priority from U.S. Provisional Application No. 60/638,079, filed Dec. 20, 2004, entitled Transaction Card Assemblies, Systems and Methods of Making, assigned to the assignee of the present invention, the complete disclosure of which is incorporated herein by reference.

BACKGROUND OF THE INVENTION

The present invention is related to transaction cards, and more specifically, to transaction card assemblies, systems, and methods of making.

Transaction cards, such as credit cards, debit cards, membership cards, stored value cards, and the like, are widely used. Such cards may include a variety of different indicia to identify the card and other features, such as the card issuer, the customer, or the like depending in part on the type of card. The information may be printed on the card using alphanumeric characters, graphics, or the like, or may be embossed into the card. Alternatively, some or all the information is encoded on the card, such as in a magnetic strip attached to the card.

Some transaction cards are coupled to a carrier having additional information. For example, stored value cards sold in retail locations may have a carrier containing promotional information, and other inducements to buy the card. The cards may be attached to the carrier, such as with an adhesive strip. Many transaction cards are coupled to their carriers in a way that makes reading those cards difficult using standard point-of-sale devices. For example, the data included on the card may be on the side of the card affixed to the card carrier. Further, the card that has data exposed runs the risk of damage to the data. Inadvertent separation of the card from the carrier also may present problems. Improvements are desired.

BRIEF SUMMARY OF THE INVENTION

The present invention is related to transaction cards, and more specifically, to transaction card assemblies, systems, and methods of making. In one embodiment, a transaction card assembly according to the present invention includes a carrier and a card integrally formed within and peripherally engaging the carrier. The card is adapted to be removed from the carrier, and includes a magnetic strip disposed on the card.

In one aspect, the carrier assembly and the card are substantially co-planar when the card peripherally engages the carrier. In some aspects, the card has generally rectangular first and second surfaces spaced apart by a peripheral edge, with four sides of the peripheral edge engaging the carrier assembly. In this manner, the card is protected by the carrier prior to its separation from the carrier. In one aspect, the card is a punch-out portion of the carrier. This may occur, for example, when an interface between the carrier and the card includes a scored region in the carrier, with the scored region defining a periphery of the card. In one aspect, the card peripherally engages the carrier in a press fit arrangement. This may occur, for example, when two opposing edges of the card peripherally engage the carrier to frictionally retain the card within the carrier. In some aspects, a wrapping such as a shrink wrap cover is disposed over the card and over a portion or all of the card carrier. In this manner, the card is further protected and retained in the carrier.

In alternative aspects, the magnetic strip includes one track, two tracks, three tracks, or more, on which data may be encoded. In some aspects, the magnetic strip includes two tracks having a same data set encoded therein. The data set may include a card identifier, a card value amount, customer information, card vendor information, and the like.

In a preferred embodiment, the magnetic strip is positioned a first distance from a card edge and is positioned a second distance from an edge of the carrier, with the card edge disposed between the magnetic strip and carrier edge. The magnetic strip may include two spaced apart tracks, with the spacing between the two tracks being substantially the same as a difference between the second distance and the first distance. In some aspects, the magnetic strip first track is positioned to be read by a point-of-sale device when the card and carrier are engaged, and the second track is positioned to be read by the point-of-sale device after the card is separated from the carrier.

In another embodiment, a transaction card assembly includes a card carrier having a card integrally formed within. The card peripherally engages the card carrier and is adapted to be removed from the card carrier. An encodable strip is disposed on the card. The strip has first and second encodable tracks. The first encodable track is positioned to be read by a point-of-sale device when the card is engaged with the card carrier, and the second encodable track is positioned to be read by the point-of-sale device after the card is separated from the carrier.

The present invention further provides methods of making transaction card assembly combinations. One such method includes forming a card carrier from a sheet of material, and forming one or more score lines within the card carrier. The score line defines a periphery of a card that is adapted for removal from the card carrier. In this manner, the card is peripherally engaged by the carrier to protect it and prevent or help prevent an unintended removal from the carrier. The method includes applying an encodable strip to a surface of the card. In one aspect, removal of the card from the card carrier creates a hole in the card carrier, which may correspond to the size of the removed card. In some aspects, the card may be imprinted, embossed, or otherwise provided with a data set. The card may be reinserted into the card carrier, with the card frictionally engaging the carrier to help maintain a coupling of the card and carrier. A wrapping or cover such as shrink wrap also may be used to maintain the coupled card and carrier arrangement.

The method may include applying the encodable strip to a portion of the card carrier in general alignment with the encodable strip portion on the card surface. In this manner, the encodable strip, which may include a magnetic strip, a uniform product code, or the like, spans the card and at least a portion of the carrier. The encodable strip includes, in one embodiment, first and second encodable tracks spaced apart from one another by a gap.

In one aspect, the gap is a same distance as a distance between an edge of the card to an edge of the card carrier. In this manner, the encodable strip can be read by a point-of-sale device whether or not the card is coupled to or engaged with the carrier. In some aspects, the first and second tracks are encoded with a same data set. In this manner, the point-of-sale device reads the same data whether it reads the card with or without the carrier attached to the card. Further, the card and carrier can be purchased together, with the card being read by a point of sale device, and maintained as a single piece. In this manner, the card may be given as a gift or the like after purchase without disengaging the card from the carrier.

Other objects, features and advantages of the present invention will become more fully apparent from the following detailed description, the appended claims and the accompanying drawings.

DESCRIPTION OF THE SPECIFIC EMBODIMENTS

Cards of the present invention may be a wide variety of cards sent to customers or available for purchase by the consuming public. Cards could be used for functions similar to or the same as those described in pending U.S. patent application Ser. No. 9/971,303, filed Oct. 3, 2001, entitled Stored Value Cards and Methods for Their Issuance; U.S. patent application Ser. No. 10/421,604, filed Apr. 22, 2003, entitled Multi-Purse Card Systems and Methods; and U.S. patent application Ser. No. 10/744,888, filed Dec. 23, 2003, entitled Stored Value Lottery Card and Methods., each of which are assigned to the assignee of the present invention, with the complete disclosures of each being incorporated herein by reference for all purposes. In some embodiments, cards of the present invention include ValueLink® gift cards manufactured and/or distributed by First Data Corporation of Englewood, Colo.

Figure 1:
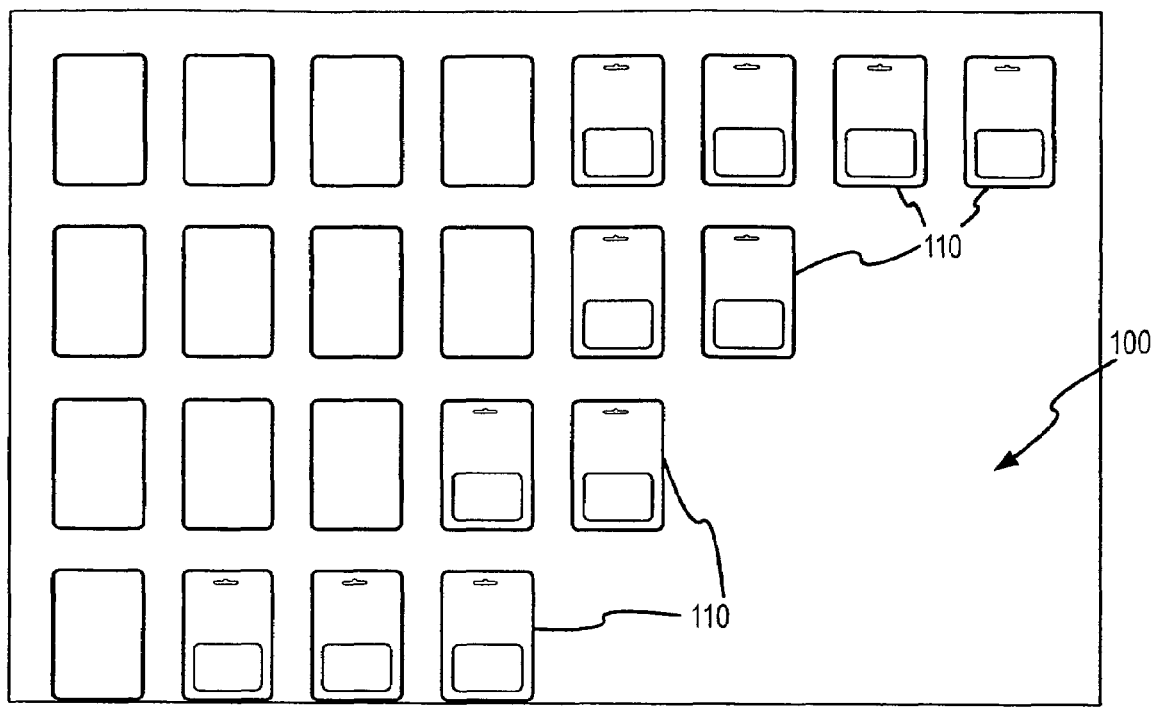
FIG. 1 is an overall view of a sheet of material for forming transaction card assemblies according to an embodiment of the present invention.
Figure 2:
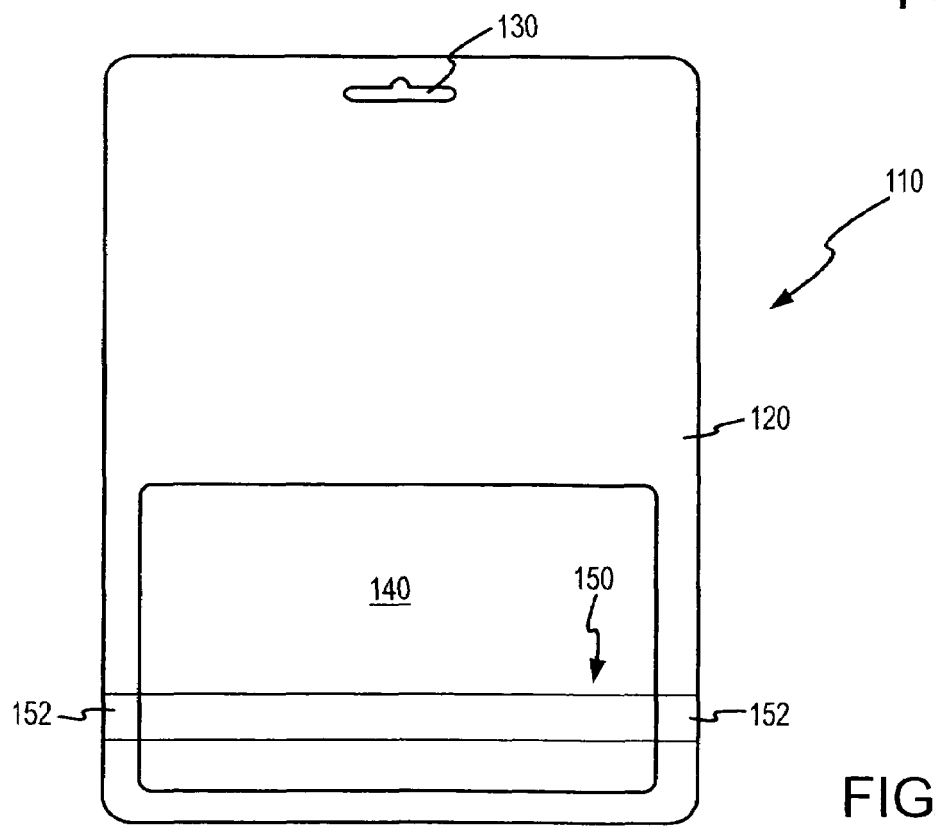
FIG. 2 is an overall rear view of a transaction card assembly according to an embodiment of the present invention.

Referring to FIGS. 1 and 2, transaction card assemblies according to an embodiment of the present invention will be described. FIG. 1 depicts a sheet of material 100 from which a plurality of transaction card assemblies 110 are manufactured. Material 100 may be a wide range of materials within the scope of the present invention including, without limitation, plastic, nylon, polyvinyl chloride (PVC), cardboard stock, paper laminated with a plastic, and the like. In one embodiment, sheet 100 comprises a material similar to that used with gift cards, credit cards, ATM cards, and the like. In one embodiment, sheet of material 100 is formed having a desired or acceptable thickness. Transaction card assemblies 110 are formed from sheet 100 using a punch dye, punch press, or other device designed to cut or remove assemblies 110 from sheet 100. In some embodiments, complete rows or entire sheets 100 of assemblies 110 are formed in a single stroke of the punch dye. While FIG. 1 depicts transaction card assemblies 110 having spaces between them, the amount of space between assemblies 110 or adjacent rows of assemblies 110 may vary from that depicted. Further, in some embodiments transaction card assemblies 110 have no space between adjacent assemblies 110.

FIG. 2 depicts a transaction card assembly 110 manufactured from sheet 100. In one embodiment, assembly 110 includes a hole 130 formed therethrough. Hole 130 may be used to hang assembly 110 from a J-hook or other point-of-purchase display. As shown in FIG. 2, assembly 100 includes a card carrier 120 and a card 140. In one embodiment, carrier 120 and card 140 are formed from sheet 100 and therefore comprise a same material. Card 140, in one embodiment, is formed within card carrier 120, with card 140 peripherally engaging card carrier 120. In one embodiment, card 140 comprises a standard CR80 card, although other size cards also fall within the scope of the present invention. Thus, in one embodiment card 140 is generally rectangular in shape having four edges and two opposing surfaces, an upper surface and a lower surface. Card surfaces may be printed, embossed, or otherwise provided with a wide range of information, including card issuer or customer identification information, such as a name, a logo, terms and conditions, or the like; a card expiration date; counterfeit protection measures such as a hologram; and the like.

In one embodiment, card 140 includes an encodable strip 150 disposed on a portion of card 140. For example, encodable strip may be disposed on a rear surface of card 140. In one embodiment, encodable strip 150 extends beyond the surface of card 140 to include end portions 152 formed on card carrier 120. In one embodiment, encodable strip end portions 152 are generally aligned with the portion of encodable strip 150 on card 140. In some embodiments, encodable strip 150 is formed on card 140 after transaction card assemblies 110 are removed from sheet of material 100. In other embodiments, encodable strips 150 are formed on sheet of material 110 prior to the separation of action card assemblies 110 therefrom.

Figure 3A:
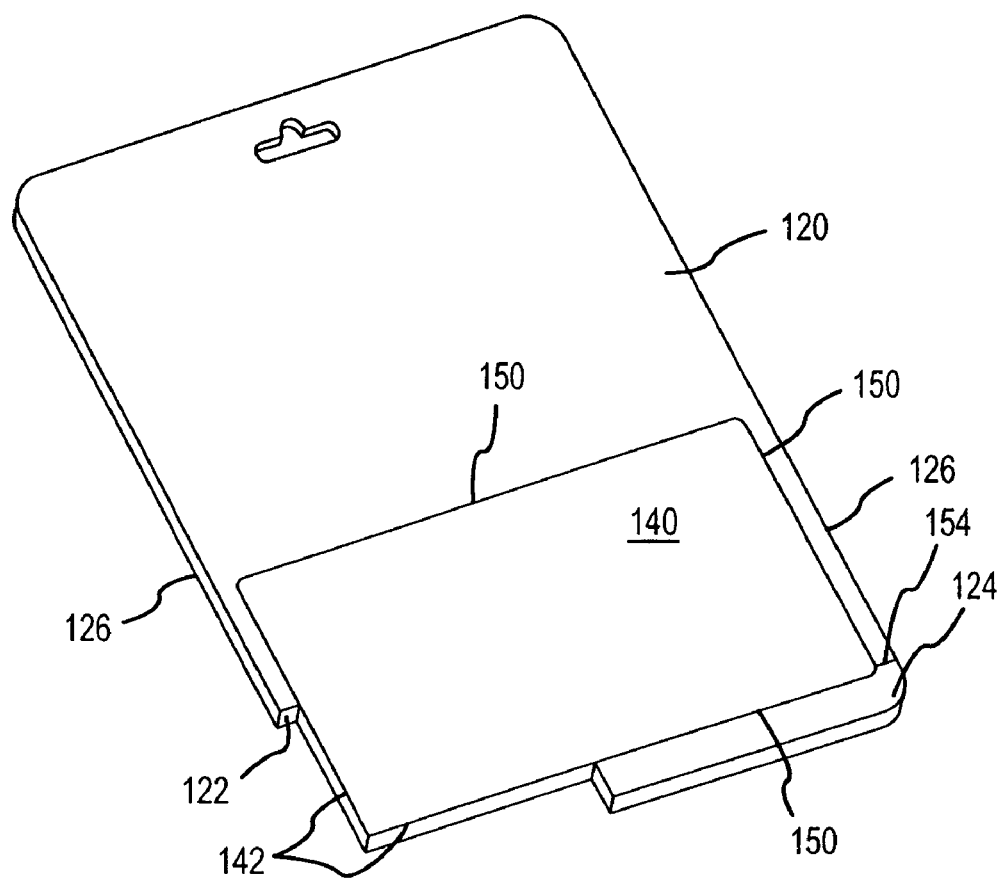
FIG. 3A is a perspective front view of a transaction card assembly according to an embodiment of the present invention.

As shown in FIG. 3A, card 140 is adapted to peripherally engage carrier 120, and in a preferred embodiment, is disposed within carrier 120. Card 140 has a peripheral edge 142 which engages or is coupled to edge 122 of card carrier 120. In one embodiment, all four peripheral edges of card 140 engage carrier 120 to couple the two together. In other embodiments, at least one side, at least two sides, or at least three sides of peripheral edge 142 engage card carrier edge 122. In still another embodiment, only a portion of one or more sides of peripheral edge 142 engage card carrier edge 122. In still another embodiment, one or more corners of peripheral edge 142 engage card carrier edge 122. The engaged carrier 120 and card 140 are generally co-planar in some embodiments, such as is shown in FIG. 3A. Preferably, card 140 can be separated from carrier 120, for subsequent use by a customer or card recipient.

Figure 3B:
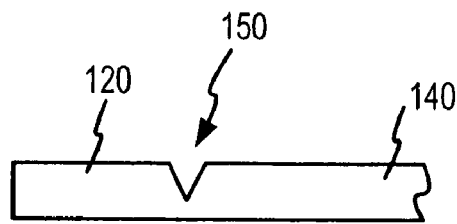
FIGS. 3B and 3C are side views depicting a scored region of a transaction card assembly according to embodiments of the present invention.
Figure 3C:
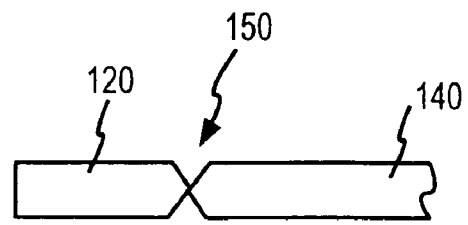

In one embodiment, peripheral edge 142 of card 140 is formed by creating a scored region within carrier 120. As shown in FIGS. 3B and 3C, one or more score lines 150 may be formed within assembly 110, so as to provide a separation line between carrier 120 and card 140. In some embodiments, score line 150 is created from a single side or surface of transaction card assembly 110 (FIG. 3B). In an alternative embodiment, score line 150 is formed from opposing surfaces of transaction card assembly 110 (FIG. 3C). In one embodiment, score lines 150 are formed simultaneous with the separation of transaction card assemblies 110 from sheet 100. In alternative embodiments, score lines 150 are formed before and/or after the separation of transaction card assemblies 110 from sheet 100.

Score line(s) 150 create a weakened interface between carrier 120 and card 140, allowing transaction cards 140 to be removed from card carriers 120. The removal of card 140 from carrier 120 may be accomplished by pressing on card 140 and/or carrier 120. Score line(s) 150 break, to allow card 140 to be removed from carrier 120. In one embodiment, card 140 is a punch-out card that snaps, or disengages from carrier 120. In one embodiment, the removal of card 140 from carrier 120 leaves a hole in carrier 120 substantially the same size and shape as card 140.

In another embodiment, an edge 124 of carrier 120 is first removed, and then card 140 is removed from the remaining portion of carrier 120. The removal of edge 124 may be facilitated, for example, by extending a score line 154 beyond card edge 142, to opposing edges 126 of carrier 120. In this manner, a portion of carrier 120 is removed, to facilitate the subsequent removal of card 140 from the remaining portion of carrier 120. In another embodiment, a fold line or score line 154 exists in card carrier 120 to help bend a first portion of card carrier 120 relative to a second portion of card carrier 120 that remains engaged to card 140. The fold line or score line may, for example, be aligned to generally bisect card 140 location within carrier 120 as opposed to being aligned with score line 150 or 154. In some embodiments, the fold line or separate score line extends between two opposing edges 126 of card carrier 120. Alternatively, the fold line runs generally parallel to opposing edges 126. In this manner, first portion of card carrier 120 is disengaged from card 140, and then the second portion of card carrier 120 is disengaged from card 140. As a result, card 140 is separated from card carrier 120 in two or more steps. The peripheral edge engagement between carrier 120 and card 140 prevents or helps prevent an accidental or unintended removal of card 140 from carrier 120. In this manner, transaction card assembly 110 is formed and remains a single piece for a desired period of time, such as during the display of card assembly 110 prior to purchase.

Figure 7:
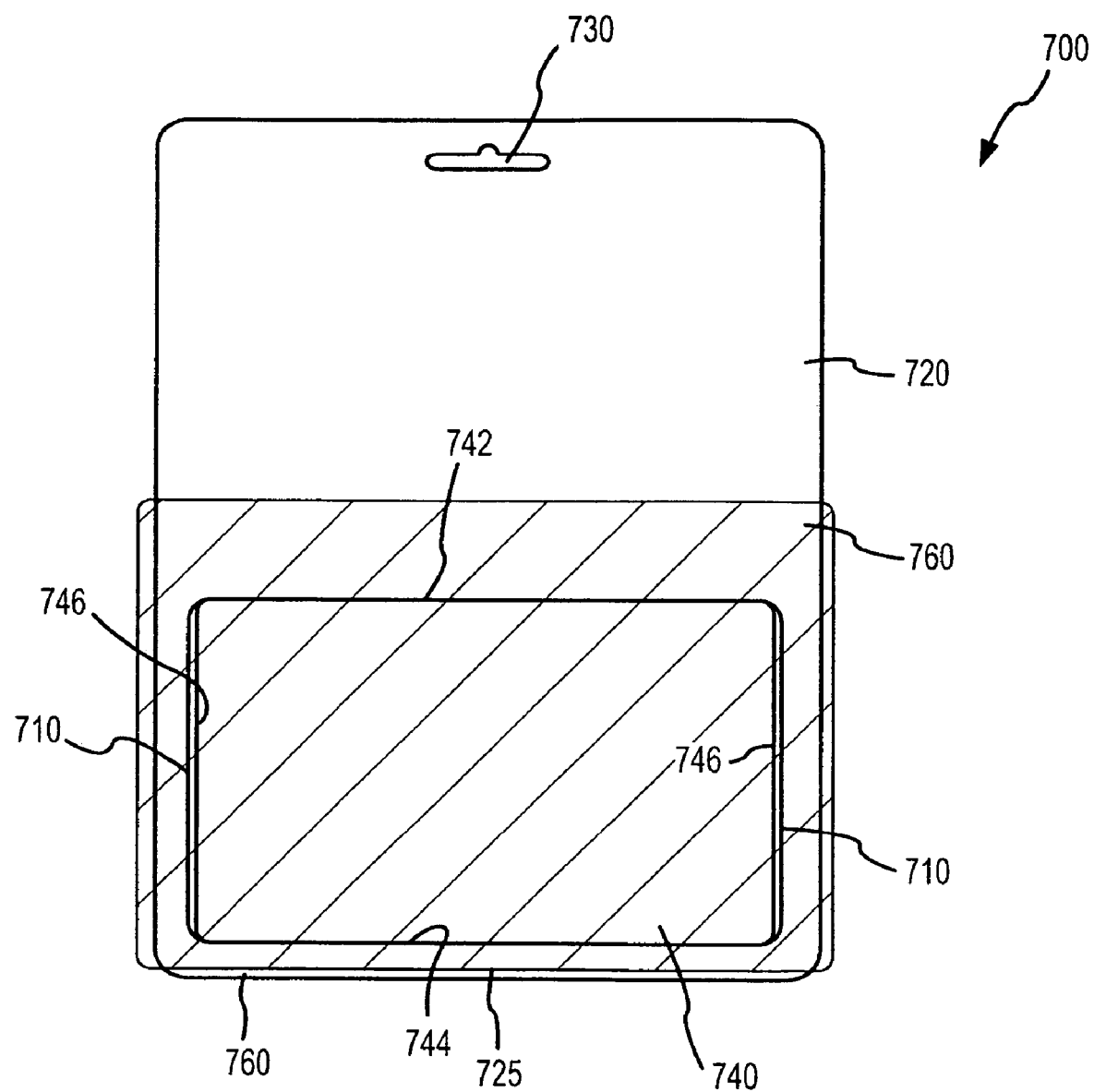
FIG. 7 is a simplified top view of a transaction card assembly according to an alternative embodiment of the present invention.

FIG. 7 depicts a transaction card assembly 700 according to another embodiment of the present invention. In this embodiment, assembly 700 includes a card carrier 720 and a card 740 frictionally engaging carrier 720. An optional hole 730 formed through card carrier 720 permits card carrier 720 to be hung on a point-of-purchase display in some embodiments. Card 740 may be formed from a same sheet of material as card carrier 720, but is further separated from carrier 720. In this manner, card 740 may be removed from carrier 720 and personalized with a desired data set. The data set may include a wide range of information including, without limitation, merchant information, customer information, account numbers, advertising, card value information, and the like. Card 740 is returned to the same or different card carrier 720, and maintained within card carrier 720. In one embodiment, card 740 is reinserted into a hole 710 in carrier 720 from which card 740 was removed. In this manner, two opposing surfaces of card 740 can be viewed by a potential customer prior to purchase of card assembly 700. Further, information may be read from one or both surfaces of card 740 by a point-of-sale device, a sales clerk, or the like, in order to facilitate the sale of card 740 and/or the activation of card 740.

In one embodiment, card 740 is at least partially retained by card carrier 720 through the frictional engagement of one or more edges of card 740 and the corresponding edges of hole 710 in card carrier 720. For example, as shown in FIG. 7, in one embodiment two opposing edges of card 740 engage carrier 720. In this manner, card 720 is securely maintained relative to card carrier 720. As shown in FIG. 7, in one embodiment an upper edge 742 and a lower edge 744 of card 740 engage card carrier 720. In this embodiment, card 740 maintains its alignment relative to an edge 725 of card carrier 720. As a result, an encodable stripe on card 740 can be maintained a known distance from edge 725 as further described below.

Side edges 746 of card 740 are shown spaced from the corresponding edges of card carrier 720, and more specifically, from the interior side edges of hole 710 formed in card carrier 720. In alternative embodiments, one or more side edges 746 engage card carrier 720 to help retain card 740 and card carrier 720. Card 740 and carrier 720 also may be frictionally coupled at portions of sides 742-746, at the card corners, or some combination thereof. Further, it will be appreciated by those skilled in the art that the use of the terms upper, lower, right, left, side, and the like may vary within the scope of the present invention depending in part upon the orientation of transfer card assembly 700.

In a particular embodiment, card 740 is press fit into hole 710 in card carrier 720. In this manner, the customer can readily remove card 740 from carrier 720 with the application of pressure to card 740 relative to carrier 720. Card 740 also may pop out of hole 710 when carrier 720 is bent. In another embodiment, a cover wrap 760 is disposed over at least a portion of card assembly 700 to help retain card 740 with carrier 720. As shown in FIG. 7, cover wrap 760 may be formed over a portion of carrier 720 having hole 710 and card 740. Alternatively, cover wrap 760 may be formed over the entire transaction card assembly 700. In some embodiments, cover wrap 760 is a shrink wrap cover, and may include, for example, a see-through plastic or film. Other materials also may be used. In one embodiment, card 740 can be read by a point-of-sale device, as further described below, while attached to carrier 720 or separated from carrier 740. Further, in one embodiment card 740 can be read by a point-of-sale device with or without cover wrap 760. Cover wrap 760 may include advertising or other information the merchant or card issuer wishes to display to the consuming public.

Figure 4A:
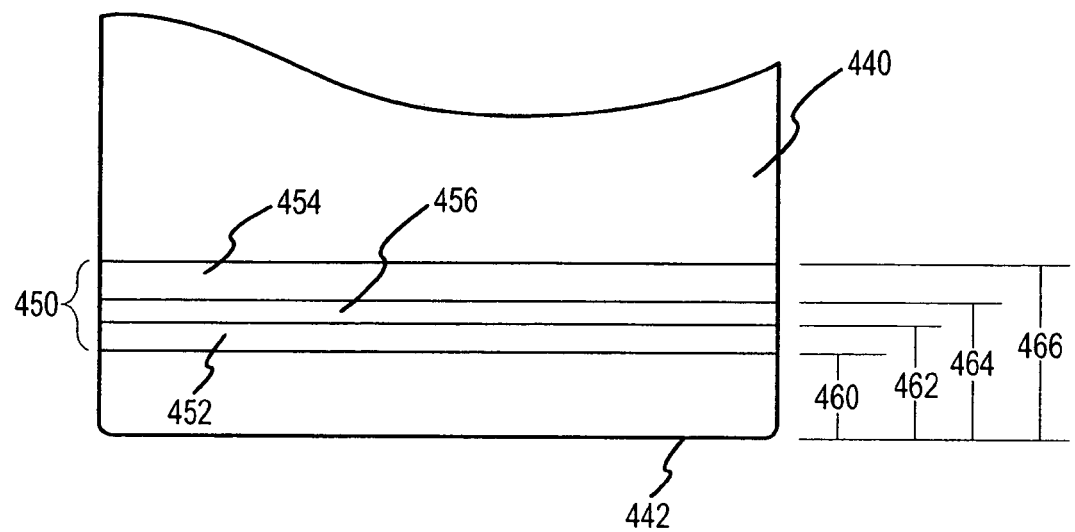
FIGS. 4A and 4B are simplified rear views of a transaction card (FIG. 4A) and a transaction card assembly (FIG. 4B) showing the spacing of an encodable strip according to an embodiment of the present invention.
Figure 4B:
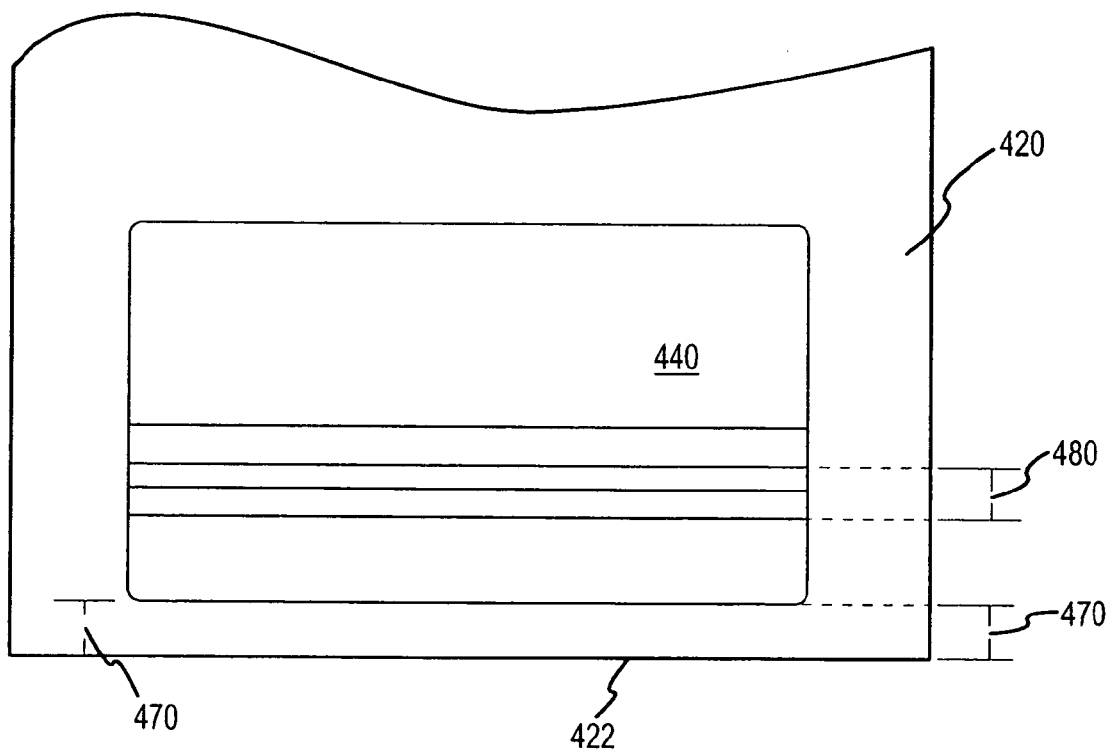

With reference to FIGS. 4A and 4B, a particular embodiment of the present invention will be described. FIG. 4A depicts a transaction card 440, and FIG. 4B depicts transaction card 440 engaged with a card carrier 420. In some embodiments, cards 440 and carriers 420 are similar or identical to cards 140 and carriers 120. Card 440 includes an encodable strip 450. In this embodiment, encodable strip 450 comprises a magnetic strip, also referred to as a magstripe. Magnetic strip 450 is comprised of a large number of tiny iron-based magnetic particles disposed in a plastic-like film. Each particle can be magnetized in either a north or south pole direction to maintain desired information. The information is laid down on magnetic strip 450 in tracks, such as tracks governed by ISO/IEC Standard 7811. Generally, a wide variety of information may be stored in magnetic strip 450, and the issuer of card 440 has the option of deciding at least some of the information contained therein. For example, magnetic strip 450 may contain merchant identification, customer identification, a card or account identifier, an expiration date, card monetary values or limits, usage records, a password or personal identification number (PIN), and the like. In this manner, cards 440 having magnetic strips 450 can be fashioned to contain desired information in accordance with the present invention.

In one embodiment, magnetic strip 450 includes a first track 452 and a second track 454 separated by a gap 456. As shown, tracks 452 and 454 are generally parallel to a lower edge 442 of transaction card 440. It will be appreciated by those skilled in the art that edge 442 may in alternative embodiments be an upper edge, a side edge, or the like depending on the orientation of card 440. As can be seen in FIG. 4A, first track 452 is spaced a distance 460 from edge 442. First track 452 has a width generally corresponding to the difference between a distance 462 and distance 460 as shown in FIG. 4A. Gap 456 corresponds to the difference between a distance 464 and distance 462 as shown in FIG. 4A. Second track 454 is positioned distance 464 from edge 442 of card 440. The width or thickness of second track 454 is the difference between a distance 466 and distance 464 that measures how far the edges of track 454 are from card edge 442. In some embodiments, distances or spacings 460-466 correspond to appropriate ANSI/ISO standards, including ANSI/ISO document 7811-2-2001. In one particular embodiment, distance 460 is 0.228 inches, distance 462 is 0.328 inches, distance 464 is 0.358 inches, and distance 466 is 0.458 inches. In this embodiment, first track 452 and second track 454 are spaced a known distance from card edge 442. In this manner, card 440 is read using a point-of-sale device by sliding or moving card 440 past a read head in the point of sale device. Second track 454 is positioned so that the point-of-sale device reads the data stored in second track 454.

FIG. 4B depicts card 440 engaged with card carrier 420. Card edge 442 is formed a distance 470 from a lower edge 422 of carrier 420. Again, lower edge 422 may be an upper edge, a side edge, or the like depending on the orientation of carrier 420. In a preferred embodiment, distance 470 generally corresponds to a spacing 480 between first track 452 and second track 454. In one embodiment, spacing 480 is the difference between distances 464 and 460 shown in FIG. 4A. Further, for embodiments in which tracks 452 and 454 have the same width, spacing 480 also corresponds to the difference between distances 466 and 462.

By defining the physical relationship between card 440 and carrier 420 as described in conjunction with FIGS. 4A and 4B, data may be read from a desired track 452, 454 by a point-of-sale device. More specifically, sliding or engaging card 440 with a point-of-sale device will cause data from second track 454 to be read when the card is separate from the carrier (FIG. 4A). Similarly, data will be read from first track 452 when the card and carrier are engaged, and the associated transaction card assembly is slid or otherwise read by a point-of-sale device. This is accomplished, at least in part, by forming distance 470 to correspond to spacing 480 between first and second tracks 452, 454. Thus, for the specific numerical embodiment described in conjunction with FIG. 4A, gap 480 and spacing 470 correspond to about 0.130 inches. In this manner, first track 452 is read using a point-of-sale device when card 440 is engaged with carrier 420.

In one embodiment, at least a portion of first and second tracks 452, 454 are encoded with a same data set. The data set may include a card identifier, a card value amount, customer information, card vendor information, and the like. In this manner, a point-of-sale device reading card 440 retrieves the same data or at least some of the same data whether card 440 is coupled to carrier 420 or separated therefrom prior to reading. In one embodiment, an encoding device (not shown) includes appropriate software to encode two tracks on card 440 with at least some of the same data in a format readable by a point-of-sale device. In some embodiments, magnetic strip 450 includes a third track (not shown). The third track may lie further from card edge 442 than first and second tracks 452, 454. Alternatively, third track is positioned closer to edge 442 than first track 452. It will be appreciated by those skilled in the art that the number of tracks may vary from the prescribed one, two, or three tracks within the scope of the present invention.

In an alternative embodiment, second track 454 and the third track are positioned to function as described above, with one of the tracks readable when card 440 is separate from carrier 420, and the other track readable when card 440 is engaged with carrier 420. In one embodiment, magnetic strip 450 is positioned closer to or adjacent card edge 442, with second track 454 and the third track operating as the two readable tracks described above. In this embodiment, the third track is positioned further from edge 442 than second track 454. First track 452 may contain additional data in the same or a different format, or may not contain data. Alternatively, first track 452 contains data in conformance with various ANSI/ISO standards.

The data encoded in tracks 452, 454 can have a variety of formats within the scope of the present invention, with some complying with magnetic strip standards provided by the American National Standards Institute (ANSI) and/or the International Organization of Standardization (OSI). In one particular embodiment, first track 452 includes at least some of the following fields: a start sentinel, a format code, an account number, a first separator, a surname which may be the customer's name, a second separator, an expiration date, a service code, a PVKI, a PVV, discretionary data, an end sentinel, and a longitudinal redundancy check (LRC). A separate field for use by VISA also may be included. Each field has the appropriate length, which may vary from a single byte (e.g., for the start and end sentinels, and the separators), to sixteen bytes (e.g., for the account number), up to N number of bytes (e.g., for the surname field to accommodate names of various lengths). In some embodiments, second track 454 contains some or all of the same data set as encoded in first track 452. In other embodiments, first track 452 and/or second track 454 contains an identifier to indicate to the point-of-sale device or an associated host computer system whether card 440 has been previously swiped. The identifier may be a single byte, or larger.

Figure 5:
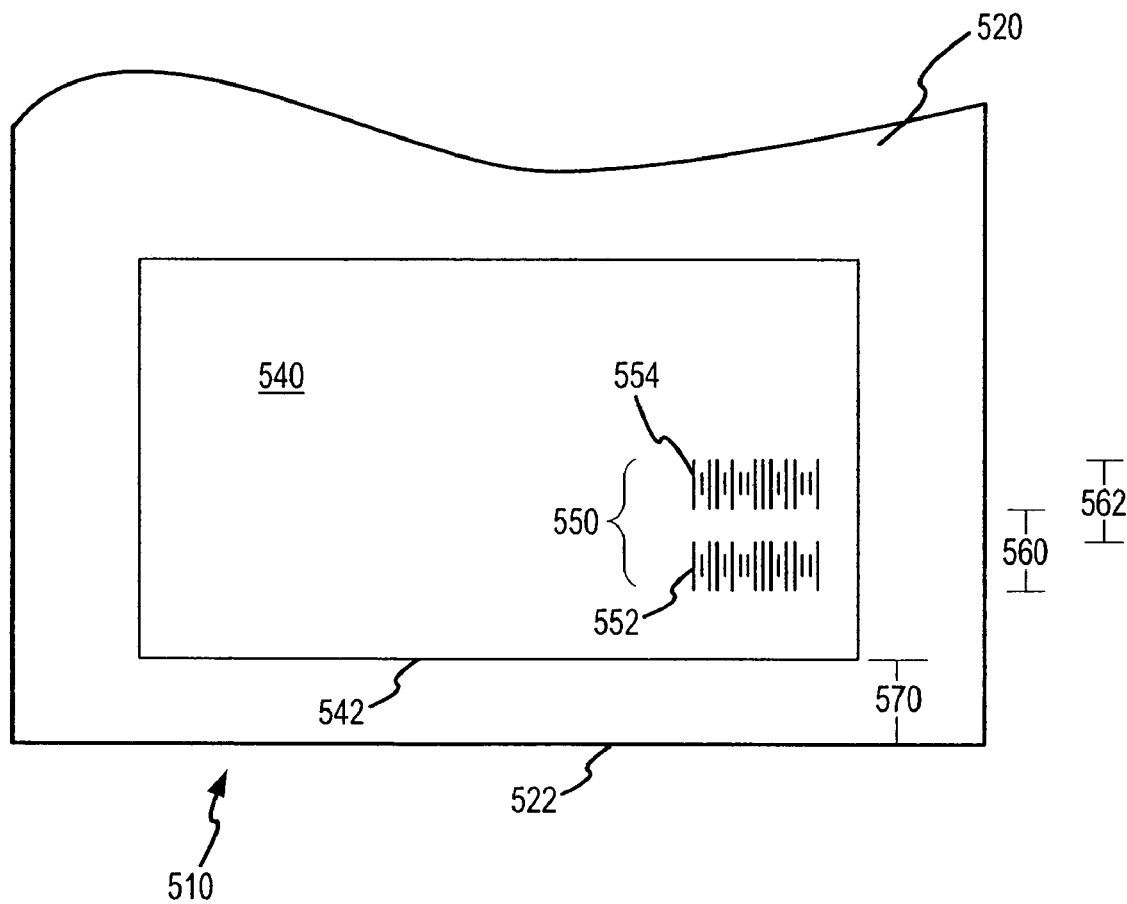
FIG. 5 is a simplified rear view of a transaction card assembly according to an alternative embodiment of the present invention.

FIG. 5 depicts an alternative embodiment of the present invention. More specifically, FIG. 5 depicts a transaction card assembly 510 having a card 540 disposed within a card carrier 520. Card 540 includes an encodable strip 550. In this embodiment, encodable strip 550 includes a first uniform product code (UPC) 552 and a second uniform product code (UPC) 554. In this embodiment, card 540 is read by a point-of-sale device that is adapted to read UPCs. Again, in one embodiment, a card edge 542 is spaced a distance 570 from a card carrier edge 522. In one embodiment, distance 570 corresponds to a gap defined as the spacing between first and second UPCs 552, 554. The gap may be measured from the lower edges of UPCs 552, 554 (gap 560) or between upper edges of UPCs 552, 554 (gap 562). In one embodiment, distance 570, gap 560 and gap 562 are a same distance or length. In a preferred embodiment, distance 570 corresponds to about 0.130 inches, although alternative distances fall with the scope of the present invention.

Figure 6:
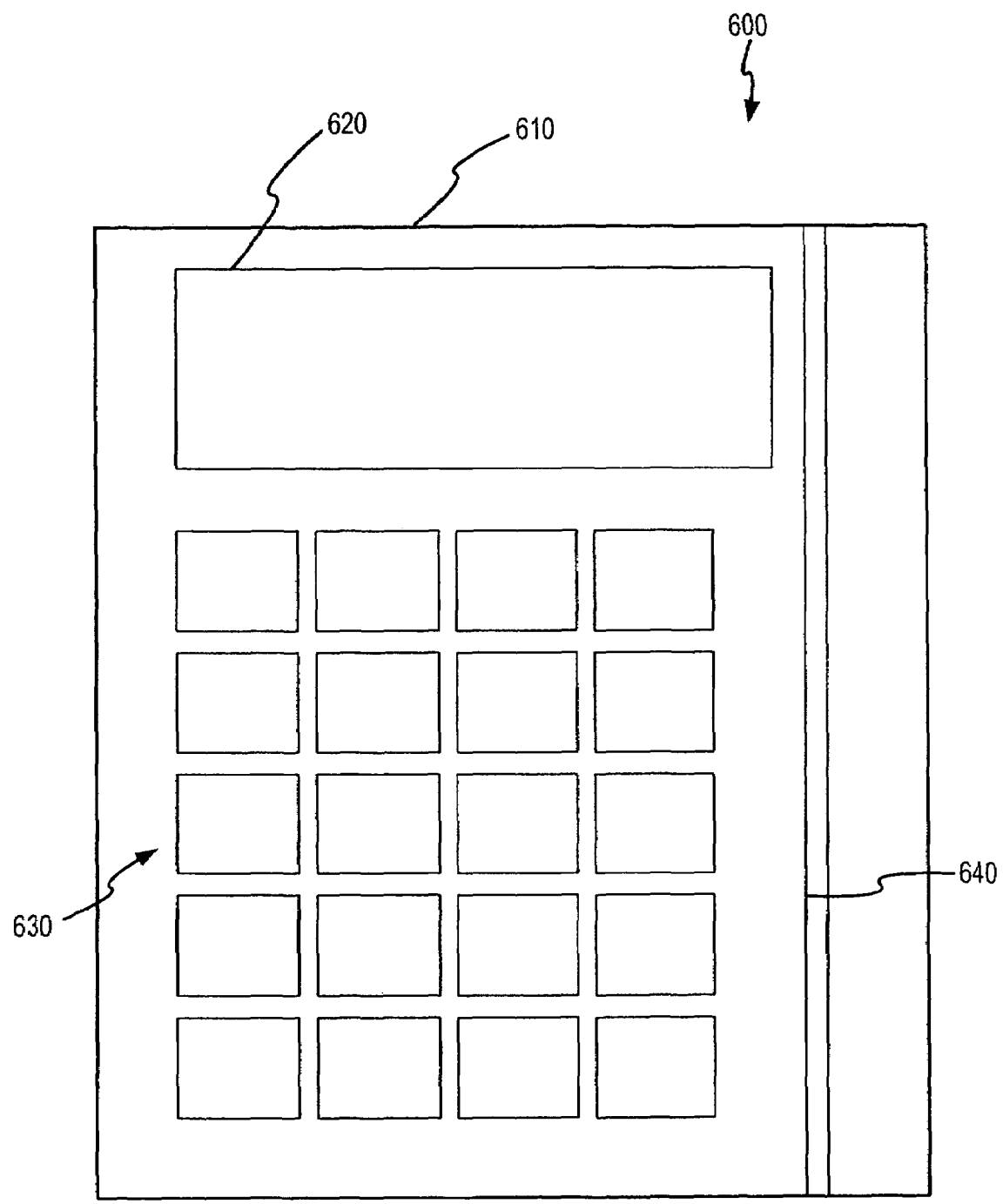
FIG. 6 is a simplified top view of a point-of-sale device according to an embodiment of the present invention for reading encodable strips disposed on transaction card assemblies of the present invention.

FIG. 6 depicts a simplified view of a point-of-sale 600 according to the present invention. In one embodiment, point-of-sale device 600 comprises a housing 610 having a display screen 620 and input devices 630. Conveniently, input devices 630 may comprise keys or buttons that may be depressed to enter information into point-of-sale device 600. Input devices 630 also may be portions of a touch screen. Input devices 630 may each be associated with one or more letters or other alpha-numeric characters, or may operate as function keys. Point-of-sale device 600 includes a track or groove 640 through which transaction card assemblies of the present invention may be slid. In one embodiment, track 640 is adapted to receive a lower edge of transaction card assemblies of the present invention, or to receive a lower edge of cards 140, 440, 540 separate from the corresponding carriers 120, 420, 520. Point-of-sale device 600 includes one or more read heads adapted to read data encoded on encodable strips, such as magnetic strips. Some or all of the data read may be shown on display 620, and may optionally be printed to provide a paper record. It will be appreciated that the invention is not intended to be limited for use with only a specific type of point-of-sale device. For example, other point-of-sale devices that may be used to read transaction cards of the present invention are described in copending U.S. application Ser. No. 10/116,619, filed Apr. 3, 2002, the complete disclosure which is herein incorporated by reference.

A method of using a transaction card assembly according to the present invention will be described. For this example, the transaction card is a gift card having a monetary value associated therewith for redemption at a particular merchant. A customer desiring to purchase the transaction card at the merchant or related location will select the transaction card assembly and either swipe the transaction card assembly through a point-of-sale device, or have a store clerk swipe the transaction card assembly through the point-of-sale device. As described above, at least one encodable track disposed on the card is positioned to be read by the point-of-sale device even when the card is engaged with the card carrier. The point-of-sale device reads the encoded data and transmits at least a portion of this data to a processing system that maintains records on transaction cards and their associated accounts. The system activates an account associated with the card being purchased. In this manner, the transaction card account associated with the purchased card assembly is activated.

In this example, the cardholder, who may be the purchaser or recipient of the card (e.g., if the card was a gift), will present the card to a checkout point-of-sale device to purchase desired items from the merchant. Typically, the purchase occurs sometime subsequent to the purchase and activation of the card noted above. Further, prior to use of the card to make a purchase, the card has been removed from the card carrier. The transaction card is swiped through a point-of-sale device to use the monetary value associated with the card account. As noted above, the point-of-sale device is adapted to read a different encodable track on the transaction card when the card is swiped without the carrier attached. The point-of-sale device creates a debit record that is forwarded to the system maintaining transaction card accounts, and the card account is debited the appropriate purchase amount. In the event the attempted purchase exceeds the allotted card value, in some embodiments the transaction is not authorized and the customer must pay for the entire purchase, or a portion of the purchase, using some other payment means. It will be appreciated by those skilled in the art that additional methods of using transaction card assemblies also fall within the scope of the present invention.

The invention has now been described in detail. However, it will be appreciated that the invention may be carried out in ways other than those illustrated in the aforesaid discussion, and that certain changes and modifications which may be practiced within the scope of the appended claims. Accordingly, the scope of this invention is not to be limited by those specific examples, but rather is to be accorded the full scope represented in the following claims.

What is claimed is:

1. A method for performing a financial transaction comprising;
   providing a transaction card assembly comprising:
   a carrier;
   a card integrally formed within and peripherally engaging the carrier, the card adapted to be removed from the carrier; and
   a magnetic strip disposed on the card;
   swiping the combined card and carrier through a point of sale device;
   reading with the point of sale device identification data from only a first track on the magnetic strip to activate an account associated with the card;
   detaching the card from the carrier;
   swiping the detached card through a point of sale device;
   reading with the point of sale device identification data from only a second track on the magnetic strip to perform a financial transaction associated with the account.

2. A method as in claim 1, wherein the combined card and carrier are swiped through a slot in the point of sale device.

3. A method as in claim 1, wherein the financial transaction comprises a debit transaction.

4. The method as in claim 3 wherein the carrier assembly and the card are substantially co-planar when the card peripherally engages the carrier and when swiped through the slot.

5. The method as in claim 3 wherein the card has generally rectangular first and second surfaces spaced apart by a peripheral edge, and wherein four sides of the peripheral edge engage the carrier assembly when the card assembly is swiped through the slot.

6. The method as in claim 1 wherein the card is a punch-out portion of the carrier, and further comprising punching out the card from the carrier.

7. The method as in claim 1 wherein an interface between the carrier and the card comprises a scored region in the carrier, the scored region defining a periphery of the card, and further comprising breaking the scores to remove the card.

8. The method as in claim 1 wherein the magnetic strip is positioned a first distance from a card edge and is positioned a second distance from an edge of the carrier, the card edge being disposed between the magnetic strip and the carrier edge.

9. The method as in claim 8 wherein a spacing between the two tracks is substantially the same as a difference between the second distance and the first distance.

10. The method as in claim 1 wherein the magnetic strip further comprises a third track.

11. The method as in claim 1 wherein the first and second tracks are encoded with a same data set.

12. The method as in claim 11 wherein the data set includes a card identifier.

13. A method for performing a financial transaction comprising;
    providing a transaction card assembly comprising:
    a carrier;
    a card integrally formed within and peripherally engaging the carrier, the card adapted to be removed from the carrier; and
    a magnetic strip disposed on the card;
    swiping the combined card and carrier through a point of sale device;
    reading with the point of sale device identification data from only a first portion on the magnetic strip to activate an account associated with the card;
    detaching the card from the carrier;
    swiping the detached card through a point of sale device;
    reading with the point of sale device identification data from only a second portion on the magnetic strip to perform a financial transaction associated with the account.

* * * * *